United States Patent
Fujita et al.

[15] 3,653,466
[45] Apr. 4, 1972

[54] LUBRICANT VALVE ASSEMBLY

[72] Inventors: Hiroshi Fujita, Shiga-ken; Akinori Kuruma, Settsu, both of Japan

[73] Assignee: Daikin Kogyo Co., Ltd., Osaka, Japan

[22] Filed: June 1, 1970

[21] Appl. No.: 42,068

[30] Foreign Application Priority Data

Oct. 15, 1969 Japan..................................44/97968

[52] U.S. Cl. ..............................................184/7 D, 184/7 F
[51] Int. Cl.....................F01m 1/06, F16n 7/14, F16n 13/22
[58] Field of Search..................137/271; 184/7, 7 D, 7 E, 7 F

[56] References Cited

UNITED STATES PATENTS

| | | | |
|---|---|---|---|
| 3,438,463 | 4/1969 | Gruber | 184/7 E |
| 3,064,759 | 11/1962 | Acker | 184/7 E |
| 3,172,578 | 3/1965 | Kemp | 184/7 D |
| 3,476,214 | 11/1969 | Callahan | 184/7 E |
| 3,500,960 | 3/1970 | Jaggi | 184/7 F |

FOREIGN PATENTS OR APPLICATIONS

| | | | |
|---|---|---|---|
| 879,068 | 10/1961 | Great Britain | 184/7 E |

Primary Examiner—Manuel A. Antonakas
Attorney—Cushman, Darby & Cushman

[57] ABSTRACT

A lubricant valve assembly comprising one manifold block unit and at least one valve element coupled with said manifold block unit. The valve element has only one measuring piston and one valving piston slidably disposed therein, and the manifold block unit has required numbers of inlets and outlets integrally therewith. Further, the manifold block unit is so constructed as to supply lubricant, introduced therein from a lubricant supply pump, to the individual valve elements coupled therewith and to receive measured quantities of lubricant from said respective valve elements and discharge the same to the points to be lubricated. Between the valve element and the manifold block unit is interposed a cross-porting structure, so that the lubricant discharged from a pair of outlet passageways of the valve element may be led to only one of the outlet passageways of said manifold block unit. Further, an adjusting rod to verify the operation of the measuring piston disposed in the valve element is fluid-tightly sealed by a sealing member which is made from polytetrafluoroethylene and hence the lubricant valve assembly is highly resistive to high temperatures.

3 Claims, 9 Drawing Figures

Patented April 4, 1972

INVENTORS
HIROSHI FUJITA
AKINORI KURUMA

BY Cushman, Darby & Cushman
ATTORNEYS

Patented April 4, 1972

INVENTORS
HIROSHI FUJITA
AKINORI KURAMA
BY Cushman, Darby & Cushman
ATTORNEYS

INVENTORS
HIROSHI FUJITA
AKINORI KURUMA
BY Cushman, Darby & Cushman
ATTORNEYS

Patented April 4, 1972

INVENTORS
HIROSHI FUJITA
AKINORI KURUMA

BY Cushman, Darby & Cushman
ATTORNEYS

LUBRICANT VALVE ASSEMBLY

The present invention relates to a valve assembly for a lubricating system which is adapted to supply measured quantities of lubricant to a number of moving points to be lubricated of a machine from a central source of supply.

The invention consists in improvements in the valve assembly of Thomas J. Gruber shown in U.S. Pat. No. 3,438,463. The valve assembly of the present invention is composed of a valve block unit and a manifold block unit. The valve block unit has a plurality of measuring pistons slidably disposed therein. The manifold block unit has formed therein two main inlets for lubricant and the same number of pairs of outlets as the number of the measuring pistons in the valve block units. For instance, a valve block unit 1 shown in FIG. 1 is provided therein with four measuring pistons 4a, 4b, 4c and 4d disposed in measuring chambers 3a, 3b, 3c and 3d respectively. A manifold block unit 2 shown in FIG. 2 is formed therein with four pairs of outlets 5a, 6a; 5b, 6b; 5c, 6c and 5d, 6d and pairs of main inlets 7a, 8a and 7b, 8b. Pressurized lubricant is introduced into the manifold block unit 2, for example, through the main inlet 7a and thence into a main passageway 11 of the valve block unit 1 through a passageway 9 in the manifold block unit 2 and a passageway 10 in the valve block unit 1. The lubricant thus introduced into the main passageway 11 urges valving pistons 13a, 13b, 13c and 13d in respective distribution chambers 12a, 12b, 12c and 12d to slide to the left and flows into the measuring chambers 3a, 3b, 3c and 3d through passageways 14a, 14b, 14c and 14d respectively. In the measuring chambers 3a, 3b, 3c and 3d, the lubricant urges the measuring pistons 4a, 4b, 4c and 4d therein to slide to the left and then reaches the other end of the main passageway 11. Thereafter, the lubricant is again led into the manifold block unit 2 through a port 15 formed in said manifold block unit and discharged from the manifold block unit 2 through the other main inlet 7b, to be supplied with pressure into an adjacent valve assembly of the same construction. By the leftward sliding movement of the measuring pistons 4a, 4b, 4c and 4d, the lubricant on the other side of the measuring chambers 3a, 3b, 3c and 3d is forced into the distribution chambers 12a, 12b, 12c and 12d through passageways 16, 16b, 16c and 16d respectively and, after passing through the intermediate portions of said distribution chambers, discharged from the manifold block unit 2 through the outlets 6a, 6b, 6c and 6d respectively.

The valve assembly of the construction described above has the advantage that when, for example, the measuring piston 4a has been worn out, the valve block unit 1 only can be removed and replaced by a new valve block unit and, therefore, a repair can be readily achieved without disconnecting a main lubricant supply conduit or discharge conduit connected to said valve assembly.

However, the valve assembly of the construction described above necessarily involves many different types of valve block units. For instance, there are required a valve block unit having one measuring piston, a valve block unit having two measuring pistons, a valve block unit having three measuring pistons, etc. Thus, in order to the valve assembly to meet the requirement for lubricating a varying number of points, many different types of valve block units must be produced, which is disadvantageous from the standpoint of mass production of the valve assembly and also adds to the cost of the valve assembly.

In addition, the number of types of the valve block units to be stored as spare parts also increases, which is also highly inconvenient and adds to the cost of the valve assembly.

The performance of the valve assembly is impaired mainly in two cases. One is the case when a wear occurs in the measuring piston or the measuring chamber and another is the case when a foreign contaminant present in the lubricant is allowed to enter between the sliding surfaces of the measuring piston and the measuring chamber, causing the so-called stick or block phenomenon. In general, the latter tends to occur before the former. In the Gruber valve assembly, the valve block unit is composed of a large number of measuring pistons assembled integrally, so that, when the performance of the valve assembly is declined by a foreign contaminant, the entire valve assembly must be replaced even if the failure occurs in only one measuring piston. The valve assembly is uneconomical also in this respect.

Furthermore, where the types of lubricant required vary extremely, it becomes necessary, in case of the Gruber valve assembly, to connect valve assemblies of different diameters of measuring chambers to the main line respectively, which requires a relatively longer assembling time and space. Namely, a minute quantity of lubricant leaks through the gap between the measuring piston and the measuring chamber and the gap between the valving piston and the distribution chamber. The quantity of the leaking lubricant is preferably on the order of a few percent of the maximum discharge. Therefore, where the valve assembly is designed such that the entire discharge can be varied only by changing the stroke of the measuring piston, a minute quantity of discharge cannot be obtained precisely or, in other words, a predetermined quantity of lubricant cannot be supplied with a predetermined precision. For this reason, it becomes necessary to provide many types of valve block units of different measuring chamber diameters beforehand. In the Gruber valve assembly, the diameters of the measuring chambers in one valve block unit are the same. Therefore, where the quantities of lubricant required vary extremely, valve block units of different measuring chamber diameters must be coupled with different manifold block units respectively to form different valve assemblies and these valve assemblies must be connected to the main line. This requires a relatively long time and space for the assembly of the lubricating system. Such disadvantage can be eliminated by forming measuring chambers of different diameters in one valve block unit but such practice is impractical from the standpoint of mass production.

Furthermore, it is occasionally necessary, depending upon the required quantity of lubricant, to discharge the entire quantity of lubricant which is usually discharged through a pair of discharge ports, through only one discharge port. In this case, a cross-porting structure must be provided between the manifold block unit and the valve block unit. In case of the Gruber valve assembly, however, it is impossible to identify at a glance the particular one of a large number of sets of discharge ports in the manifold block unit which is led through the cross-porting structure, if such cross-porting structure is provided, and hence a special consideration must be given in assembling the lubricating system. Thus, the Gruber valve assembly is not foolproof.

The principal object of the present invention, therefore, is to provide a valve assembly which is composed of a plurality of valve elements of only one type and, therefore, can be provided in any form so as to readily meet a varying demand.

Another object of the invention is to provide a valve assembly which requires only one type of valve element to be stored when the valve block unit is stored as a spare part.

Still another object of the invention is to provide a valve assembly which is composed of a plurality of valve elements each having a measuring piston and a valving piston therein, so that when the measuring piston and/or the valving piston have or has become unserviceable, the normal function of the valve assembly may readily be restored only by replacing the valve element, comprising the defective piston or pistons, with a new one.

Still another object of the invention is to provide a valve assembly which is so constructed that where the quantities of lubricant required vary, a valve assembly which singly discharges such varying quantities of lubricant can be obtained by coupling with a manifold block unit a plurality of valve elements whose maximum discharges are different from each other.

Still another object of the invention is to provide a valve assembly which is so constructed that a cross-porting structure can be provided between a valve element and a manifold block unit only when it is desired to discharge the entire lubricant to be discharged through a pair of discharge ports of the manifold block unit through only one of said discharge ports, whereby a height difference is produced between the valve element provided with the cross-porting structure and the valve element not provided with the cross-porting structure so as to enable the working discharge port to be identified at a glance and thereby to make the valve assembly foolproof.

These and other objects of the invention will be more fully understood from the following detailed description when taken in conjunction with the accompanying drawings which form a part of this specification and in which:

FIGS. 1 and 2 are perspective views, partially shown in section, of the Gruber valve assembly, in which FIG. 1 shows a valve block unit and FIG. 2 shows a manifold block unit;

Figure 1:
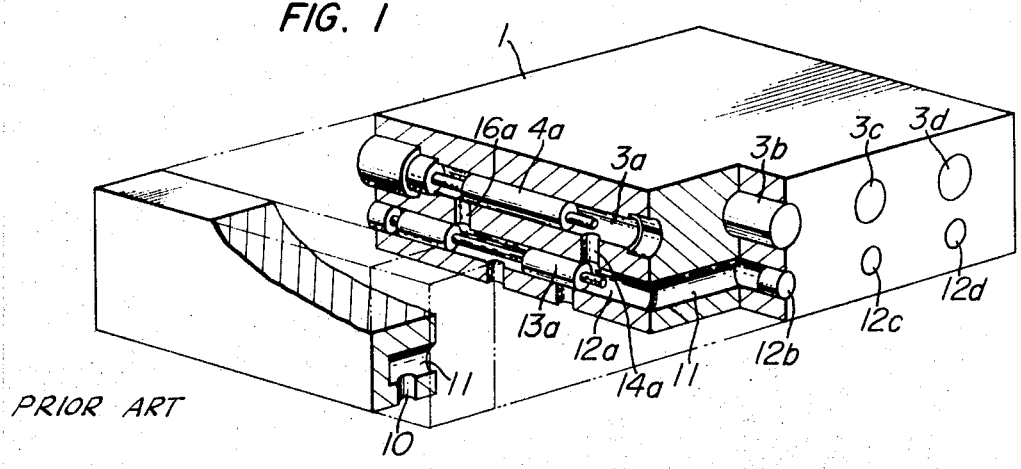
Figure 2:
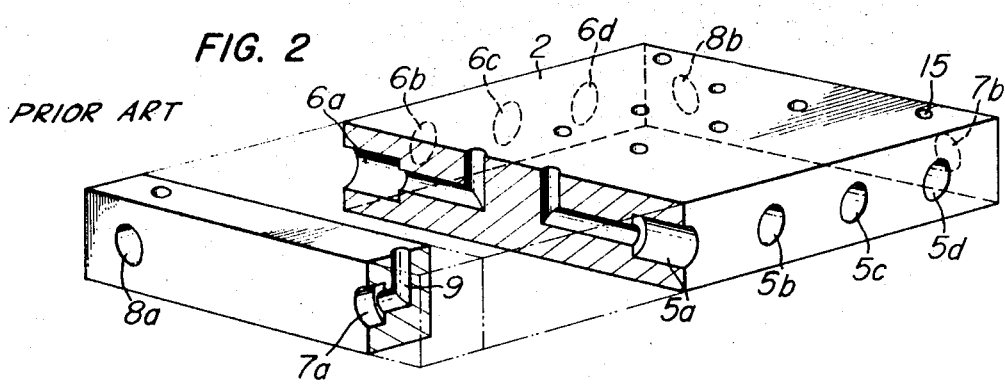
Figure 3:
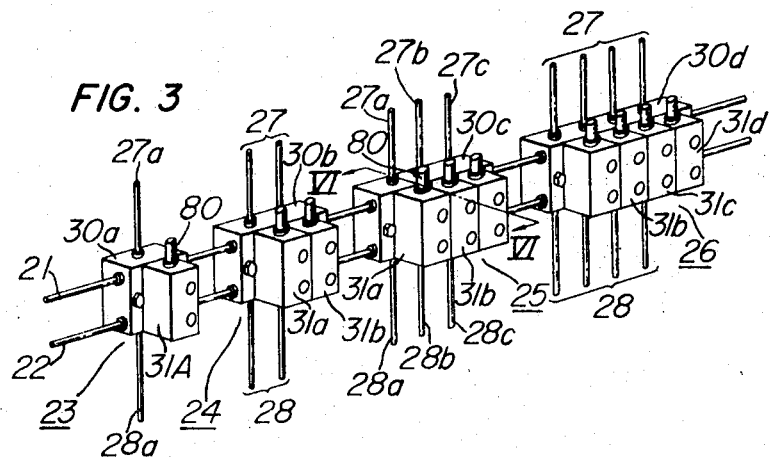
FIG. 3 is a perspective view of a series of the valve assemblies according to the present invention, connected to main lubricant supply conduits of a lubricating system.

The valve assembly of the present invention will be described in detail hereinafter with reference to the drawings. Referring first to FIG. 3, there is shown a lubricating system which comprises four valve assemblies 23, 24, 25 and 26 connected to a pair of lubricant supply conduits 21 and 22. The valve assemblies are each composed of a manifold block unit and a valve element or valve elements of the same constructions but have different number of outlets. Namely, the valve assemblies 23, 24, 25 and 26 shown in FIG. 3 include unitary manifold block units 30a, 30b, 30c and 30d and one, two three and four of valve elements 31 coupled therewith respectively. Further, the valve assemblies 23, 24, 25 and 26 of FIG. 3 have a pair of outlet lines 27 and 28 connected thereto and pressurized lubricant introduced alternately into the lubricant supply conduits 21 and 22 is supplied to respective moving points from the associated valve assemblies through said outlet lines. Each valve element has a measuring piston and a valving piston disposed therein and each therein and each manifold block unit is provided with inlets and outlets for connection with the lubricant supply conduits 21, 22 and the outlet lines 27, 28 respectively. Thus, it will be seen that when the measuring piston or valving piston has become inoperative or been subject to wear upon passage of a certain time, only the valve element 31 which comprises the worn or inoperative piston can be removed from the manifold block unit 30, without disconnecting the valve assembly from the lubricant supply conduits 21, 22 and the outlet lines 27, 28, and replaced by a new one.

Figure 5:
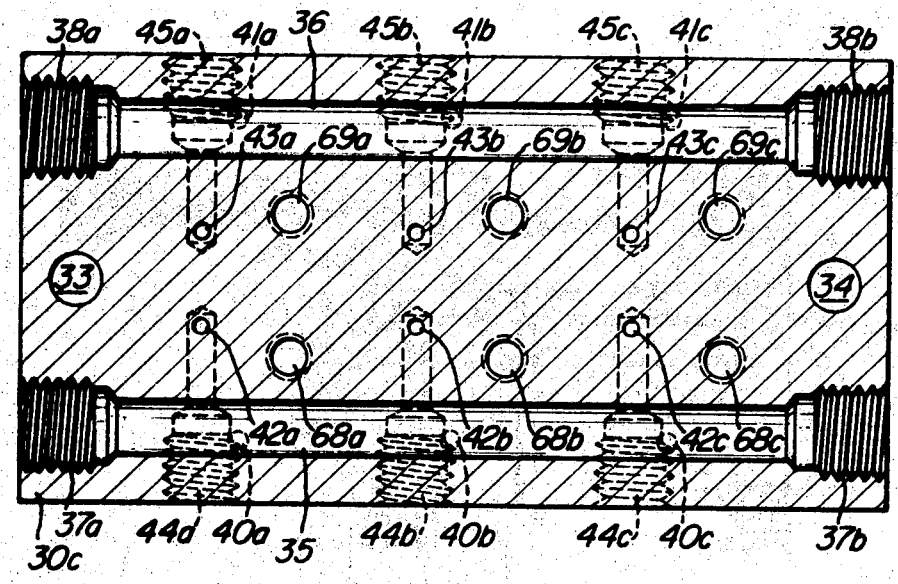
FIG. 5 is a sectional view taken on the line V—V of FIG. 4.

FIG. 5 is a sectional view of the manifold block unit 30c of the valve assembly 25 in the lubricating system of FIG. 3. The manifold block unit 30c is provided with through-holes 33, 34 so that it may be secured to a machine or other supporting member by means of bolts extending through said through-holes. It is also provided with main passageways 35, 36 bored through the length thereof and an internal thread is formed in each of the opposite open ends 37a, 37b and 38a, 38b of the respective passageways, providing for connection with the lubricant supply conduits 21, 22. Further, three passageways 40a, 40b, 40c and 41a, 41b, 41c are formed at a suitable interval in communication with the main passageways 35, 36 respectively, through which the pressurized lubricant passing through said main passageways 35, 36 is discharged from the manifold block unit 30c and introduced into the three valve elements 31a, 31b, 31c coupled with said manifold block unit. The manifold block unit 30c is also provided with mounting holes 68a, 69a; 68b, 69b and 68c, 69c to provide for coupling of the three valve elements 31 therewith.

Outlet passageway 42a, 42b, 42c and 43a, 43b, 43c are formed in the manifold block unit 30c in suitably spaced relation for leading the lubricant, measured by the respective valve elements 31a, 31b, 31c, to the respective points of lubrication therethrough. The open ends 44a, 44b, 44c and 45a, 45b, 45c of the outlet passageways 42a, 42b, 42c and 43a, 43b, 43c are each provided with an internal thread therein to provide for connection with the outlet lines 27a, 27b, 27c and 28a, 28b, 28c respectively.

As described above, the manifold block unit 30 is formed therein with the main passageways 35, 36 and these main passageways are communicated with the three valve elements, coupled with said manifold block unit, through the passageways 40a, 40b, 40c and 41a, 41b, 41c respectively. Namely, according to the present invention, a desired number of the valve elements 31, each having one measuring piston and one valving piston disposed therein, are coupled with the manifold block unit 30c to form a valve assembly, instead of coupling the valve block unit 1, having a large number of measuring pistons disposed therein, with the manifold block unit 2 as in the Gruber valve assembly.

Figure 4:
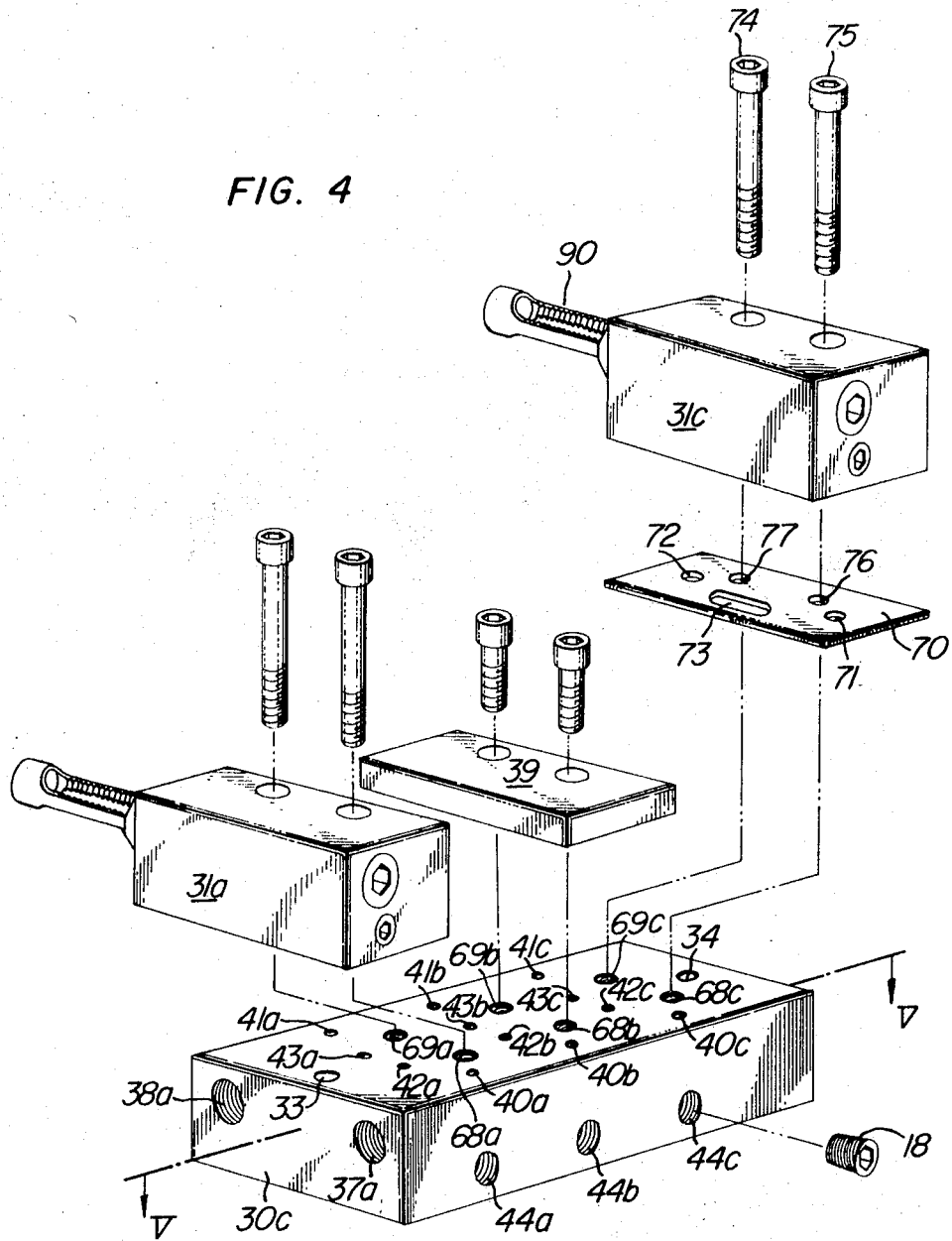
FIG. 4 is an exploded perspective view showing the valve assembly of this invention in an enlarged scale.

For instance, it is possible, as shown in FIG. 4, to couple two valve elements 31a, 31c with the manifold block unit 30 having three pairs of outlets 44a, 45a; 44b, 45b; 44c, 45c, while closing the passageways 42b, 43b with a blind cover 39. Further, in the valve assembly 25 of FIG. 3, if the valve element 31c, for example, has failed, it is not necessary to remove all of the valve elements 31a, 31b, 31c from the manifold block unit 30 but the valve element 31c only can be replaced, so that the normal function of the valve assembly can be restored not only economically but also in a very short period of time. The valve assemblies 23, 24, 25, 26 of FIG. 3 can be obtained only by coupling one, two three and four of the valve elements 31 with the manifold block units 31 having one, two, three and four pairs of outlets respectively. Namely, any desired form of valve assembly can be obtained from only one type of valve element. This makes a mass production of the valve assembly feasible and enables the valve assembly to be provided at low costs.

When a malfunction occurs in the valve assembly it is only necessary to replace the failed valve element and, therefore, only one type of valve element need be stored as a spare parts to provide for repair of the failed one. Therefore, the storage of spare parts is very easy. In addition, when the quantity of lubricant required varies, it is only necessary to couple with the manifold block unit a valve element having a different maximum discharge. Therefore, only a short period of time is required for assembling the valve assembly and only a small space is required for mounting the same.

Figure 6:
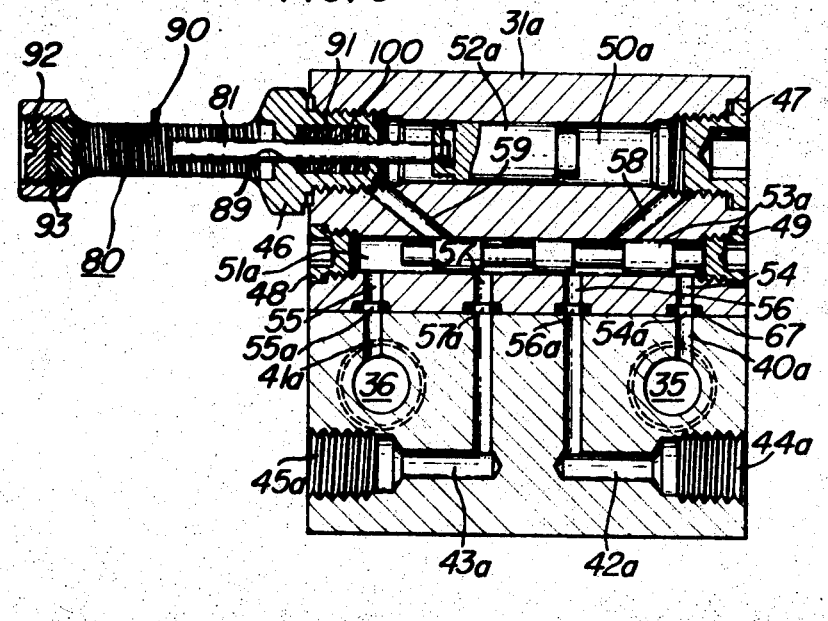
FIG. 6 is a sectional view taken on the line VI—VI of FIG. 3.

FIG. 6 is a sectional view taken on the line VI—VI of FIG. 3, i.e., a sectional view of the valve assembly comprising the manifold block unit 30c and the wave element 31a coupled with each other. The valve element 31a has two through-holes formed therein and the opposite ends of said through-holes are fluid-tightly closed with plugs 46, 47 and 48, 49 respectively, to form a measuring chamber 50a and a distribution chamber 51a. The measuring chamber 50a and the distribution chamber 51a have a measuring piston 52a and a valving piston 53a disposed therein respectively. The passageways 40a, 41a of the manifold block unit 30a are communicated with the distribution chamber 51a through passageways 54, 55 respectively, and the outlet passages 42a, 43a of said manifold block unit 30c are communicated with the distribution chamber 51a through passageways 56, 57, respectively. Further, the distribution chamber 51a and the measuring chamber 50a are communicated with each other through passageways 58, 59.

The valve assembly constructed as described above operates as follows: Let it be assumed that lubricant from the main source of supply flows in the line 22 from the left to right as viewed in FIG. 3 and that the valve assembly 25 of FIG. 6 is composed of the valve element 31a and the manifold block unit 30c of the valve assembly 25 shown in FIG. 3. The pressurized lubricant is introduced through the inlet 37a (FIG. 5)

into the main passageway 35 and thence into the passageway 40a. As shown in FIG. 6, a sealing member 67 is provided at an opening 54a of the valve element, so that the lubricant flows into the right side of the distribution chamber 51a through a passageway 54. Similarly, the pressurized lubricant is introduced into the distribution chambers 51b, 51c of the other valve elements 31b, 31c coupled with the manifold block unit 31. The pressurized lubricant supplied into the right side of the distribution chamber 51a causes the valving piston 53a to move to the left. As the valving piston 53a moves to the left, the distribution chamber 51a and the measuring chamber 50a are communicated with each other through a passageway 58, so that the pressurized lubricant in the right side of the distribution chamber 51a flows into the right side of the measuring chamber 50a. The pressurized lubricant thus admitted into the right side of the measuring chamber 50a causes the measuring piston 52a to move to the left, so that a predetermined quantity of lubricant present in the left side of the measuring chamber 50a is expelled into the center of the distribution chamber 51a through a passageway 59 and thence supplied to a pertinent moving point to be lubricated through the outlet passageway 43a and the outlet 45a of the manifold block unit 30c and through the outlet line 27a.

In the manner described, measured quantities of lubricant are supplied to the points to be lubricated through the outlet lines 27 of all valve assemblies 23, 24, 25, 26 ... connected to the lubricant supply conduit 22. Upon completion of the lubrication, the pressure in the supply conduit 22 rises and the lubricant supply is reversed from the conduit 22 to the conduit 21. A mechanism to change-over the lubricant supply line is known in the art and will not be described herein.

Next, the function of the valve assembly when the lubricant is supplied through the supply conduit 21, will be explained hereunder: The lubricant flows the line 21 from the left to right as viewed in FIG. 3, and enters the main passageway 36 of the valve assembly 25 through the inlet 38a. From the main passageway 36, the lubricant is led into a passageway 55 of the valve element 31a through the passageway 21a and thence into the left side of the distribution chamber 51a. The lubricant thus introduced into the left side of the distribution chamber 51a causes the valving piston 53a to move to the right, whereby the distribution chamber 51a and the measuring chamber 50a are communicated with each other through the passageway 59. Therefore, the pressurized lubricant in the left side of the distribution chamber 51a flows into the left side of the measuring chamber 50a and causes the measuring piston 52a to move to the right. Consequently, a predetermined quantity of lubricant in the right side of the measuring chamber 50a is expelled into the center of the distribution chamber 51a through the passageway 58, and thence led into the outlet passage 42a of the manifold block unit 30 through the passageway 56. Thereafter, the lubricant flows into the outlet line 28a through the outlet 44a, to be supplied to the point of lubrication.

When the measuring pistons 52 and the valving pistons 53 of all the valve elements 31 have been moved to the right in the manner described, the pressure in the supply line 21 rises and the lubricant supply is shifted from the line 21 to the line 22 in the same manner as described above, and one cycle of lubrication is completed by this step. Namely, the lubricant is discharged from a pair of outlets 44a, 45a in one cycle of lubrication.

Figure 7:
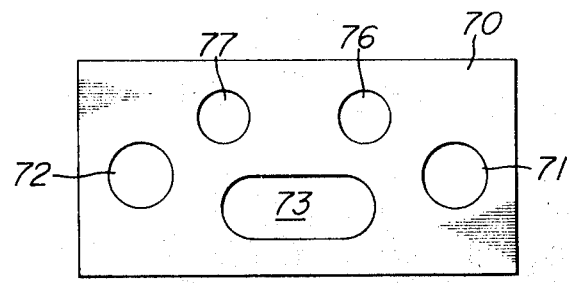
FIG. 7 is a plan view of a cross-porting structure.
Figure 8:
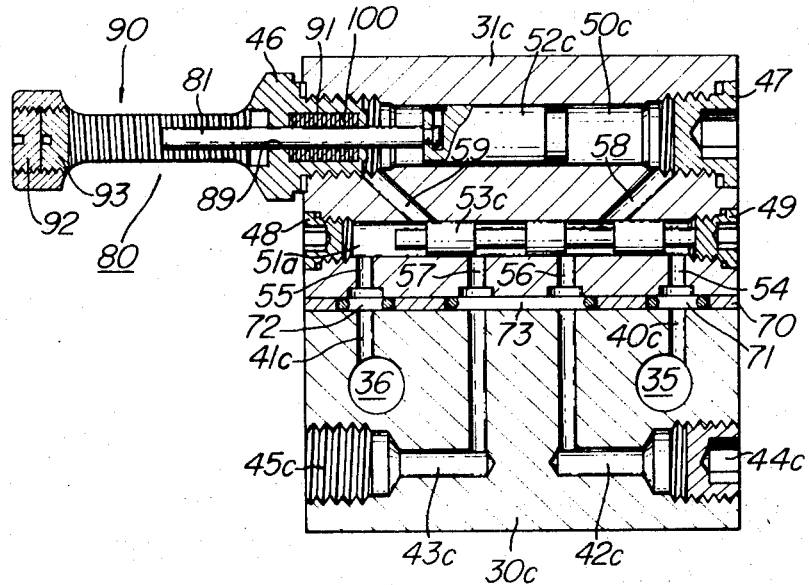
FIG. 8 is a sectional view of the cross-porting structure of FIG. 7 as incorporated in the valve assembly of FIG. 6.

The valve assembly described above is so constructed that the measured quantity of lubricant in the left or right side of the measuring chamber 50a is discharged through the outlet 44a or 45a. Alternatively, the valve assembly of the invention may be constructed such that the measured quantity of lubricant in the left or right side of the measuring chamber 50a is discharged through only one of the outlets, and such valve assembly will be described hereinafter:

FIG. 7 is a plan view of a cross-porting structure 70. The cross-porting structure 70 has a plane of the same area as the area of the bottom surface of the valve element 31c, and is provided therein with through-holes 71, 72 at locations corresponding to the passageways 54, 55 of the valve element 31c, a slot 73 for communicating the passageways 56 and 57 of the valve element 31c with each other and holes 76, 77 to provide for passage of bolts 74, 75 (FIG. 4) therethrough. As shown in FIG. 4, the cross-porting structure 70 is mounted on the manifold block unit 30c in such a manner that the slot 73 is located over the outlet passageways 42c, 43c and the holes 76, 77 is positioned in register with the holes 68c, 69c and the holes 71, 72 in register with the passageways 40c, 41c of the manifold block unit respectively, and thereafter the valve element 31c is mounted on said cross-porting structure. The manifold block unit 30c, the cross-porting structure 70 and the valve element 31c thus assembled are tightened together by means of the bolts 74, 75. FIG. 8 shows a cross-section of the valve assembly thus obtained. This valve assembly operates in the following manner:

Suppose that the outlet 44c is closed with a plug 78 (FIG. 4). The valve element 31c is of the same construction as the valve element 31a described above. When pressurized lubricant is supplied through the main passageway 35, a predetermined quantity of lubricant in the left side of the measuring chamber 50c is discharged through the outlet passageway 43c, the outlet 45c and the outlet line 28c, whereas when the pressurized lubricant is supplied into the main passageway 36, upon shifting of the pressure line by the change-over mechanism, a predetermined quantity of lubricant in the right side of the measuring chamber 50c is introduced into the outlet passageway 42c of the manifold block unit 30 through the passageway 58, the center of the distribution chamber 51c and the passageway 56, as in the case of the preceding valve assembly. However, since the outlet 44c is closed, the lubricant in the passageway 42c is led into the outlet passageway 43c on the other side, through the slot 73 in the cross-porting structure 70, and discharged through the outlet 45c and the outlet line 28c. As described above, when the cross-porting structure 70 is provided between the valve element 31 and the manifold block unit 30, the height of the valve element is increased by the thickness of said cross-porting structure. Therefore, whether the cross-porting structure is used or not can be recognized at a glance by only taking a look at the height of the valve element and the valve assembly can be made foolproof.

In the valve assembly of the present invention which operates as described above, the operation of the measuring piston 52 is verified by an adjusting rod or the stroke of the measuring piston 52 is adjusted by an indicator 80 to control the discharge of lubricant.

Figure 9:
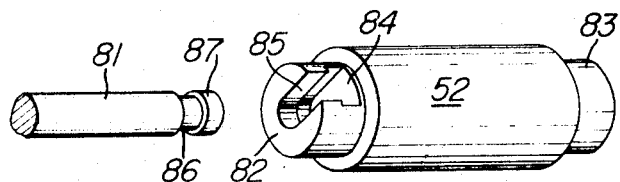
FIG. 9 is an exploded perspective view of an adjusting rod and a measuring piston.

FIG. 9 is a perspective view of the measuring piston 52 and the adjusting rod 81. The measuring piston 52 is formed with projections 82, 83 at the opposite ends thereof and one of said projections 82 is provided with a large diameter and a small diameter U-shaped grooves 84, 85. On the other hand, the adjusting rod 81 has a reduced diameter portion 86 formed at one end portion thereof to define a head 87, the diameter of said reduced diameter portion 86 being equal to the diameter of the small diameter U-shaped groove 85 and the diameter of said head 87 being equal to the diameter of the large diameter U-shaped groove 84. The adjusting rod is coupled with the measuring piston 52, with the head 87 of the formed being received in the large diameter U-shaped groove 84 of the latter.

The plug 46 at the left hand end of the measuring chamber 50 has a through-hole 89 formed therein and the adjusting rod 81 extends through said through-hole 89, with the outer end thereof projecting outwardly from the valve element 31, as shown in FIGS. 6 and 8. The left hand end of the through-hole 89 is provided with an internal thread and nuts 92, 93 are threaded into the internally threaded end of the through-hole 89. The adjusting rod 81 abuts against the nut 93 when the measuring piston 52 is at the left end extremity of its stroke. It will, therefore, be understood that by suitably adjusting the positions of the nuts 92, 93, the stroke of the measuring piston 52 can be controlled and hence the discharge of lubricant can be varied. The plug 46 is also formed therein with a sight window 90 (FIG. 4), so that the operation of the measuring piston 52 may be verified by watching the operation of the adjusting rod 81 externally through said sight window.

Between the through-hole 89 and the adjusting rod 81 is provided a sealing member 100, which is produced by a process described hereunder: A fibrous powder consisting of a mixture of polyetrafluoroethylene and filler is dispersed in an aqueous medium to form a network structure and thereafter a thin paper obtained by sintering the network structure is cut into annular shape. A laminate of the annular sheets of thin paper is compressed and, after boring a through-hole of the same diameter as the diameter of the adjusting rod 81, mounted in an enlarged portion 91 of the through-hole 89 in the plug 46 to constitute the sealing member 100.

Since the sealing member 100 is produced by compressing a laminate of a number of thin sheets of paper made in the manner described above, it is highly elastic and further, since the individual sheet of paper constitutes the so-called sealing lip by sealing the rod, an excellent sealing effect can be obtained. Further, since polyetrafluoroethylene is used, the friction between the sealing member 100 and the adjusting rod 81 is small and the useful life of the sealing member is long. Valve assemblies of the type being discussed herein are frequently used at such places as iron works where the ambient temperature is extremely high. In this respect, the use of the sealing member 100 described above is highly advantageous in enhancing the durability of the valve assembly and in obtaining an excellent sealing effect, because the sealing member is completely free of deformation and deterioration under heat, owing to the heat-resistant property of the polytetrafluoroethylene.

As has been described in detail hereinbefore, the valve assembly according to the present invention is composed of one manifold block unit and a desired number of valve elements of the same construction coupled with said manifold block unit, and achieves the various advantages as mentioned above. The valve assembly of the invention is also convenient in that, during operation, a discharge of lubricant twice as much as the discharge from one outlet of a single valve element can simultaneously be obtained from one of a pair of outlets of a selected valve element, by closing the other outlet with a plug. It is also to be noted that according to the invention, sealing between the adjusting rod and the valve body can be effected completely, which has been one of the problems in the prior art valve assemblies.

What is claimed is:

1. A lubricant valve assembly comprising a manifold block unit and at least one valve element removably coupled with said manifold block unit; said manifold block unit being provided therein with two main passageways, a plurality of pairs of passageways communicating with each of said main passageways, a respective plurality of pairs of outlets for discharging lubricant to be supplied to points to be lubricated and a plurality of sets of outlet passageways communicating with said pairs of outlets respectively; each valve element being formed therein with a distribution chamber and a measuring chamber and having a valving piston and a measuring piston slidably mounted in said chambers respectively, the opposite ends of said distribution chamber being communicated with the passageways of said manifold block unit respectively through first other passageways, the central portion of said distribution chamber being communicated with the outlet passageways of said manifold block unit through second other passageways, and the left and right side portions of said distribution chamber and said measuring chamber being communicated with each other through oblique passageways, said valve assembly being operative in such a manner that, when pressurized lubricant is introduced into either one of the two main passageways of said manifold block unit, the valving piston of each valve element is caused to slide to the left or right and, therefore, the measuring piston thereof is also caused to slide in the same direction under lubricant pressure supplied through said oblique passageway, whereby a measured quantity of lubricant in the right or left side portion of the measuring chamber is expelled and discharged from the respective outlet through either one of the respective outlet passageways in the manifold block unit.

2. A lubricant valve assembly as defined in claim 1, wherein a separate cross-porting structure having formed therein a hole communicating with a said pair of passageways in the manifold block unit and two holes communicating with the respective pair of outlet passageways in said manifold block unit respectively is interposed between said manifold block unit and one said valve element, so that lubricant may be discharged from only one of the respective outlet passageways.

3. A lubricant valve assembly as defined in claim 1, wherein said measuring chamber of at least one valve element is made open to the outside of that valve element and a plug having a sight window formed therein is fluid-tightly inserted into said open end of the measuring chamber, whereas an adjusting rod is connected at one end to one end of the measuring piston, with the other end extending through a through-hole formed in said plug, and a sealing member is fitted in the space between the wall of said through-hole of the plug and said adjusting rod to seal said adjusting rod, said sealing member consisting of a laminate of a number of thin sheets of paper compressed together, which paper is made of a sintered polytetrafluoroethylene short fiber.

* * * * *